United States Patent
Dong et al.

(10) Patent No.: US 6,549,542 B1
(45) Date of Patent: Apr. 15, 2003

(54) VARIABLE CHANNEL DEVICE FOR WIDEBAND CDMA SYSTEM

(75) Inventors: Sung-Soo Dong, Seoul (KR); Se-Jin Kang, Seoul (KR)

(73) Assignee: Samsung Electronics Co, Ltd., Suwon (KR)

( * ) Notice: Subject to any disclaimer, the term of this patent is extended or adjusted under 35 U.S.C. 154(b) by 0 days.

(21) Appl. No.: 09/421,801

(22) Filed: Oct. 20, 1999

(30) Foreign Application Priority Data

Oct. 20, 1998 (KR) .............................. 98-43931

(51) Int. Cl.[7] .............................................. H04B 7/216
(52) U.S. Cl. ...................................... 370/441; 375/146
(58) Field of Search ................................. 370/395, 441, 370/342, 318, 370; 375/225, 130–146, 340–349, 141, 147; 455/522, 442; 714/790–796, 704, 758

(56) References Cited

U.S. PATENT DOCUMENTS

| | | | | |
|---|---|---|---|---|
| 6,208,699 B1 | * | 3/2001 | Chen et al. | 375/340 |
| 6,366,778 B1 | * | 4/2002 | Bender et al. | 455/442 |
| 6,404,802 B1 | * | 6/2002 | Kang et al. | 375/146 |

* cited by examiner

Primary Examiner—Wellington Chin
Assistant Examiner—Prenell Jones
(74) Attorney, Agent, or Firm—Cha & Reiter

(57) ABSTRACT

A traffic variable channel device for a W-CDMA system comprising a convolutional encoder for receiving traffic information bits; a symbol puncturer connected to the convolutional encoder; an inserter connected to the symbol puncturer; a multiplexer connected to the inserter and the symbol puncturer; a scramble code generator for receiving a scramble code seed; an AND gate connected to the scramble code generator, a scramble select signal and a forward/reverse select signal; and, a scramble code spreader connected to the multiplexer and the AND gate for generating a forward/reverse traffic channel signal.

19 Claims, 18 Drawing Sheets

VARIABLE CHANNEL DEVICE FOR WIDEBAND CDMA SYSTEM

CLAIM OF PRIORITY

This application claims priority to an application entitled "Variable Channel Device for Wideband CDMA System" filed in the Korean Industrial Property Office on Oct. 20, 1998 and assigned Ser. No. 98-43931, the contents of which are hereby incorporated by reference.

BACKGROUND OF THE INVENTION

1. Field of the Invention

The present invention generally relates to a CDMA (Code Division Multiple Access) system, and in particular, to a variable channel device for a wideband CDMA system which can be used both in a base station and a radio terminal of a wideband CDMA WLL (Wireless Local Loop) system.

2. Description of the Related Art

A CDMA system multiplies user signals with unique codes to spread the user signals and then transmits the spread user signals on a single carrier frequency. At the receiving end, the received signals are despread and then demultiplied using the same code to retrieve the user signals. The CDMA system uses this spread band scheme to increase the frequency utilization efficiency, and further provides message encryption using codes to enhance the authentication process and to protect sensitive subscriber information.

In a CDMA system, a channel for transmitting a signal from a base station to a radio terminal is called a forward link, and a channel for transmitting a signal from the radio terminal to the base station is called a reverse link.

A wideband CDMA (hereinafter, referred to as "W-CDMA") system has a channel spacing of 5 MHz or 10 MHz. A convolutional encoder is typically used for reducing errors in the transmission bits. Orthogonal codes are uniquely assigned to respective channels for identifying the forward link channels. The W-CDMA system employs a direct sequence spreading technique and supports a chip rate of 4.096 Mcps (chips per second). Each channel is transmitted by Binary Phase Shift Keying (BPSK) waveform, and thereafter is transmitted by Quadrature Phase Shift Keying (QPSK). Thus, the channel spacing can be spread at much higher spreading rates.

The W-CDMA channel structure is disclosed in RHEE, "CDMA Cellular Mobile Communications and Network Security", Chapter 9 and 10: Prentice Hall PTR, 1997. According to that reference, a channel for a W-CDMA system is classified into a power control and signaling (PCS) channel and a traffic channel. The PCS channel includes the reverse and forward pilot channels, and the signaling channels. The traffic channel includes an access channel, a sync channel, a paging channel, and a traffic channel for transmitting the actual data.

A brief description will be made hereinbelow with regard to a channel structure specified in "Radio Access Standard V2.0 for WLL" as proposed by Korea Electronics Telecommunications Research Institute (ETRI).

The reverse modulation channel of a radio terminal includes an access channel and a reverse traffic channel. The access channel is comprised of an access pilot channel and an access information channel. As shown in FIG. 1A, the input bits of the access pilot channel, which are all 0's, are spread with a reverse link sequence $R_c$ (101) and Hadamard codes $H_0$ and $H_1$ (102), and then converted to a final pilot signal through a baseband filter 103 and a carrier multiplier 104. As shown in FIG. 1B, information bits of the access channel (ACH) are spread after passing a convolutional encoder 107, a block interleaver 108, and a symbol repeater 109.

The reverse traffic channel is comprised of a pilot, a PCS channel, and a traffic channel. As shown in FIG. 2A, information bits of the PPCS channel are multiplexed by a multiplexer 201 before spreading. As shown in FIG. 2B, information bits of the reverse traffic channel (R-TCH) are spread after passing a convolutional encoder 213, a symbol puncturer 214, symbol repeaters 215 and 217, and a serial-to-parallel (S/P) converter 216.

The reverse traffic channel operating in a multi-signal mode is comprised of a pilot channel, a PCS channel, a reserve channel, and a plurality of reverse traffic channels. As shown in FIG. 3A, information bits of the pilot channel, the PCS channel, the reverse channel, and the signaling channel, which constitute the reverse traffic channel operating in the multi-signal mode, are multiplexed by a multiplexer 301 before spreading. As shown in FIGS. 3B and 3C, information bits of an $n^{th}$ (or $m^{th}$) reverse traffic channel (R-TCH) are spread after passing a convolutional encoder 313 (or 323), a symbol puncturer 314 (or 324), symbol repeaters 315 and 317 (or 325 and 327) and an S/P converter 316 (or 326).

The access channel operating in a packet mode is comprised of an access pilot channel and a packet access channel. As shown in FIG. 4A, information bits of the access pilot channel are all 0's. As shown in FIG. 4B, information bits of the packet access channel (PACH) are spread after passing a convolutional encoder 407, a block interleaver 408 and a symbol repeater 409.

The reverse traffic channel operating in the packet mode is composed of a pilot channel, a packet signaling channel, and a reverse packet traffic channel. As shown in FIG. 5A, information bits of the pilot channel and the packet signaling channel (PSCH) are multiplexed by a multiplexer 501 before spreading. As shown in FIG. 5B, information bits of the reverse packet traffic channel (R-PTCH) are spread after passing a convolutional encoder 512, a block interleaver 513, symbol repeaters 514 and 516, and an S/P converter 515.

A forward modulation channel of the base station is comprised of a pilot channel, a sync channel, a paging channel, a traffic channel, and a power control and signaling (PCS) channel. As shown in FIG. 6A, information bits of the pilot channel, which are all 0's, are spread with a Hadamard code $H_0$ (601) and a forward link I/Q-arm sequences $R_c$ (602), and then converted to a final transmission signal s(t) while passing through a baseband filter 603 and a carrier multiplier 604. Furthermore, information bits of the sync channel are spread after passing a convolutional encoder 607, a block interleaver 608, an S/P converter 609, and a symbol repeater 610.

As shown in FIG. 6B, information bits of the paging channel are spread after passing a convolutional encoder 617, a block interleaver 618, an S/P converter 619, and a symbol repeater 620. As shown in FIG. 6C, information bits of the traffic channel are spread after passing a convolutional encoder 626, a symbol puncturer 627, a scramble code spreader 629, an S/P converter 630, and a symbol repeater 631. As shown in FIG. 6D, information bits of the signaling channel are spread after passing a convolutional encoder 638, a block interleaver 639 and a symbol repeater 640. Furthermore, information bits of the power control and reserve channel are spread after passing symbol repeaters 646 and 647. The signal on the signaling channel can be exchanged with the signal on the power control and reserve channel.

As shown in FIG. 6E, information bits of the forward packet traffic channel operating in the packet mode are spread after passing a convolutional encoder 646, a block interleaver 647, a scramble code spreader 649, an S/P converter 650, and a symbol repeater 651.

Constructing a channel device for a CDMA system having various channels as illustrated in FIGS. 1 through 6 is undesirable, especially if the channel devices are implemented in a single chip, such as an ASIC (Application Specific Integrated Circuit). The ASIC will experience decreased reliability and increased power consumption.

SUMMARY OF THE INVENTION

It is, therefore, one of the objects of the present invention to provide a variable channel device for a W-CDMA system, in which various channels share similar function blocks, and these shared function blocks are controlled by an external register.

In accordance with one aspect of the present invention, a PCS/PPCS variable channel device for a W-CDMA system comprises a frame quality indicator for receiving information bits of a reverse power control channel; a serial-to-parallel converter connected to the frame quality indicator; a first multiplexer connected to the frame quality indicator and the serial-to-parallel converter; a first symbol repeater connected to the first multiplexer; a second symbol repeater for repeating symbols of discontinuous transmission data for a reserve channel; a second multiplexer connected to receive the output of the frame quality indicator, the serial-to-parallel converter, information bits of a pilot channel and the second symbol repeater; a third symbol repeater connected to the second multiplexer; a convolutional encoder for receiving information bits for a signaling channel; a symbol puncturer connected to the convolutional encoder, an inserter connected to the symbol puncturer; a third multiplexer connected to the symbol puncturer and the inserter; a first time division multiplexer connected to receive information bits of the pilot channel, the first symbol repeater, the third symbol repeater and the third multiplexer, for outputting a reverse/PPCS (Pilot Power Control and Signaling) channel signal; a first AND gate connected to the third multiplexer and a PCS (Power Control and Signaling) select signal; a fourth symbol repeater for repeating symbols of discontinuous transmission data of the reserve channel; a second time division multiplexer connected to receive information bits for a forward power control channel and the fourth symbol repeater; a fifth symbol repeater connected to the second time division multiplexer; and, a second AND gate connected to the fifth symbol repeater and connected to receive the PCS select signal, for outputting a forward/PCS channel signal.

In accordance with another aspect of the present invention, a traffic variable channel device for a W-CDMA system comprises a convolutional encoder for receiving traffic information bits; a symbol puncturer connected to the convolutional encoder; an inserter connected to the symbol puncturer; a multiplexer connected to the inserter and the symbol puncturer; a scramble code generator for receiving a scramble code seed; an AND gate connected to the scramble code generator, and for receiving a scramble select signal and a forward/reverse select signal; and, a scramble code spreader connected to the multiplexer and the AND gate for generating a forward/reverse traffic channel signal.

A BRIEF DESCRIPTION OF THE DRAWINGS

The above and other objects, features, and advantages of the present invention will become more apparent from the following detailed description when taken in conjunction with the accompanying drawings in which.

A DETAILED DESCRIPTION OF THE PREFERRED EMBODIMENT

A preferred embodiment of the present invention will be described hereinbelow with reference to the accompanying drawings. For the purpose of clarity, well-known functions or constructions known to those skilled in this art are not described in detail as they would obscure the invention in unnecessary detail.

Figure 7:
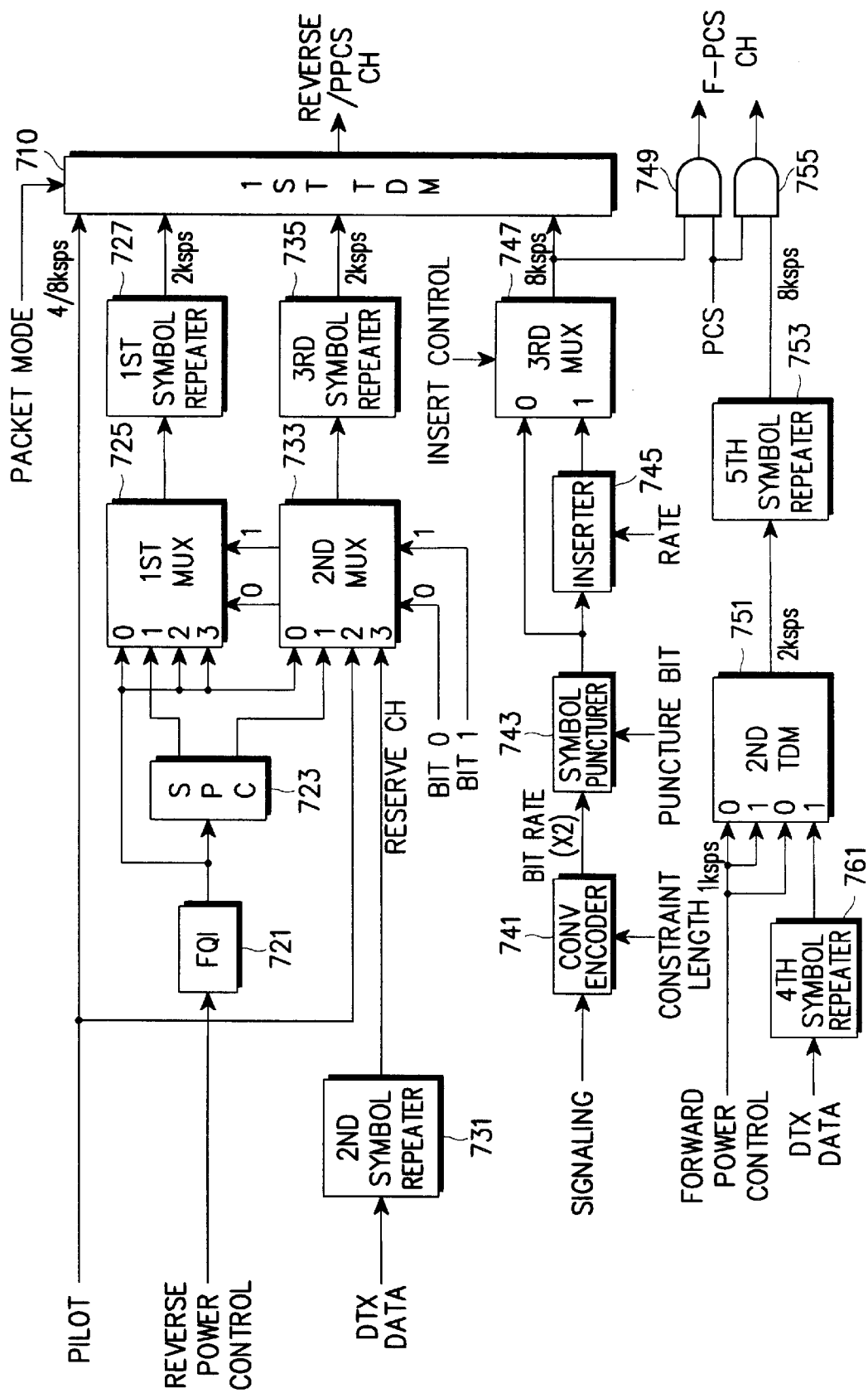
FIG. 7 is a block diagram illustrating a PCS/PPCS variable channel device according to one embodiment of the present invention.

FIG. 7 illustrates a PCS (Power Control and Signaling)/PPCS (Pilot and PCS) variable channel device according to an embodiment of the present invention. As illustrated, the PCS/PPCS variable channel device includes a frame quality indicator (FQI) 721 for receiving information bits of a reverse power control channel; a serial-to-parallel converter (SPC) 723 connected to receive the output of the frame quality indicator 721; a first multiplexer 725 connected to receive the output of the frame quality indicator 721 and the output of the serial-to-parallel converter 723; a first symbol repeater 727 connected to receive the output of the first multiplexer 725; a second symbol repeater 731 for repeating the symbols of discontinuous transmission (DTX) data of a reserve channel; a second multiplexer 733 connected to receive the output of the frame quality indicator 721, output of the serial-to-parallel converter 723, output of the second symbol repeater 731, and information bits of a pilot channel; a third symbol repeater 735 connected to receive the output of the second multiplexer 733; a convolutional encoder 741 for receiving information bits of a signaling channel; a symbol puncturer 743 connected to the output of the convolutional encoder 741; an inserter 745 connected to receive the output of the symbol puncturer 743; a third multiplexer 747 connected to receive the output of the symbol puncturer 743 and the inserter 745; a first time division multiplexer (TDM) 710 connected to receive the information bits of a pilot channel, the output of the first symbol repeater 727, the third symbol repeater 735 and the third multiplexer 747, collectively, and outputting a signal for a reverse/PPCS channel; a first AND gate 749 connected to receive the output of the third multiplexer 747 and a PCS select signal, for outputting an I (In-phase)-signal for a forward/PCS channel; a fourth symbol repeater 761 for repeating the symbols of DTX data received therein; a second time division multiplexer 751 for receiving information bits of a forward power control channel and connected to receive the output of the fourth symbol repeater 761; a fifth symbol repeater for repeating symbols from the output of the second time division multilplexer 759; and, a second AND gate 755 connected to receive the output of the fifth symbol repeater 753 and a PCS select signal, for outputting a Q (Quadrature phase)-signal for the forward/PCS channel.

The frame quality indicator 721 adds 5-bit information for checking error in the information bits of the reverse power control channel, so that a receiver can determine whether the information bits of the power control channels are received with errors. The receiver performs the checking operation by analyzing these error checking bits.

The first and second 4×1 multiplexers 725 and 733 each output one of the selected four input signals in response to a 2-bit reserve channel select signal. The first multiplexer 725 receives the output signal of the frame quality indicator 721 at $0^{th}$, $2^{nd}$ and $3^{rd}$ input nodes, and also receives the upper output signal of the serial-to-parallel converter 723 at a first input node. The first multiplexer 725 selects the upper bit signal in response to the reserve channel select signal, '01'.

The second multiplexer 733 receives the output signal of the frame quality indicator 721 at a $0^{th}$ input node, a lower output signal of the serial-to-parallel converter 723 at a $1^{st}$ input node, the information bits, which are all 0's, of the pilot channel at a $2^{nd}$ input node, and an output signal of the second symbol repeater 731 at a $3^{rd}$ input node. The second multiplexer 733 selects the discontinuous transmission (DTX) data for the reserve channel in response to the reserve channel select signal, '11'.

The convolutional encoder 741 convolutionally encodes the information bits of the signaling channel according a constraint length which is determined by a single-bit constraint length select signal. The constrain length is 9 when the constraint length select signal is 0, and the constraint length select signal is 7 when the constraint length select signal is 1.

The symbol puncturer 743 punctures specific bits from the convolutionally encoded symbols according to a puncturing technique, wherein the bits to be punctured are selected by a puncture bit select signal. The symbol puncturer 743 does not perform in response to the puncture bit select signal of 0; however, when the puncture bit select signal is 5 or 9, it punctures the associated number of bits from the encoded symbols. The inserter 745 inserts a specific bit block in the symbol-punctured signal in response to a rate select signal. The third multiplexer 747 selects the bit block-inserted signal or the non-bit block-inserted signal in response to an insert control signal.

The first-time-division-multiplexer 710 time division multiplexes 4 Ksps information bits (which are all 0's) of the pilot channel, a 2 Ksps signal output from the first symbol repeater 727, a 2 Ksps signal output from the third symbol repeater 735, and an 8 Ksps signal output from the third multiplexer 747, and then outputs a 16 Ksps PCS/PPCS channel signal. However, when the variable channel device of FIG. 7 operates in a packet mode in response to a packet mode signal received therein, the first time division multiplexer 710 multiplexes 8 Ksps information bits of the pilot channel and 8 Ksps signal output from the third multiplexer 747.

The second-time-division-multiplexer 751, which is comprised of a 2×1 multiplexer and a 2×1 time division multiplexer, turns ON/OFF the discontinuous transmission data in response to the reserve channel select signal. The second time division multiplexer 751 receives information bits of the forward power control channel at $0^{th}$ input nodes of the internal multiplexer and the time division multiplexer, receives the information bits of the forward power control channel at a $1^{st}$ input node of the internal multiplexer; and, receives symbol-repeated discontinuous transmission data output from the fourth symbol repeater 761 at a $1^{st}$ input node of the time division multiplexer. The second-time-division-multiplexer 751 repeats the information bits of the forward power control channel twice in response to the reserve channel select signal of 0, and time-division multiplexes the information bits of the forward power control channel and the symbol-repeated discontinuous transmission data in response to the reserve channel select signal of 1.

Figure 1A:
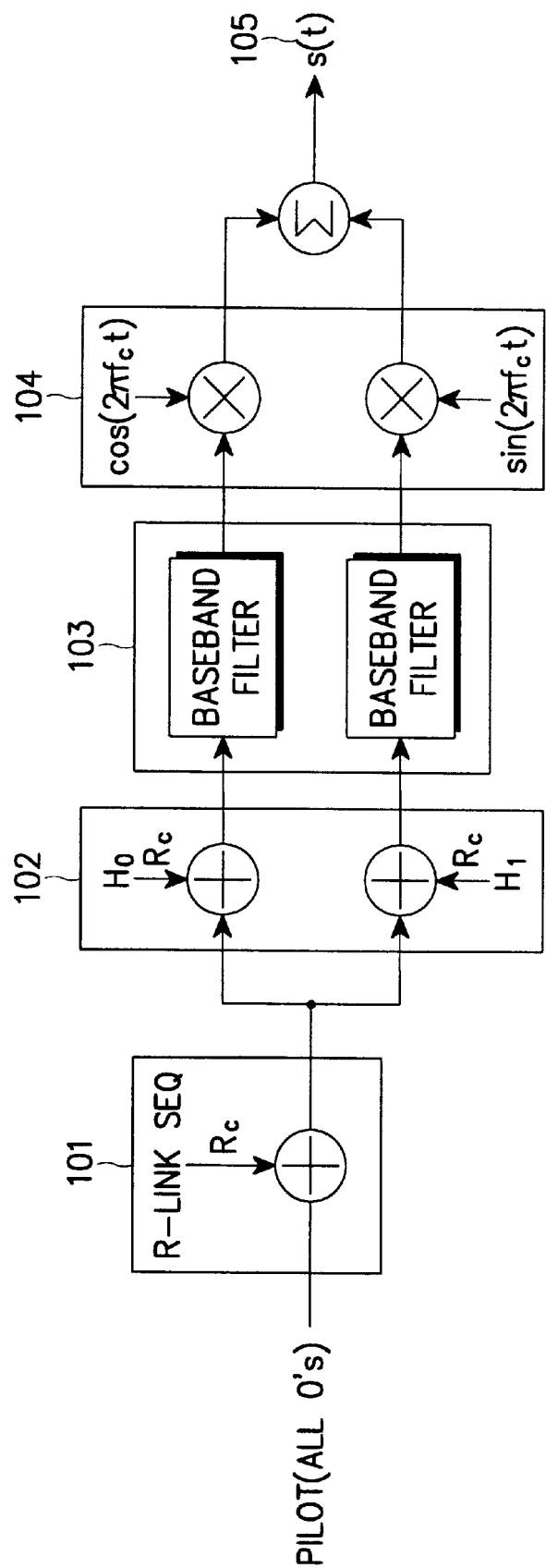
FIGS. 1A and 1B are block diagrams illustrating an access channel structure in a conventional W-CDMA system.
Figure 4A:
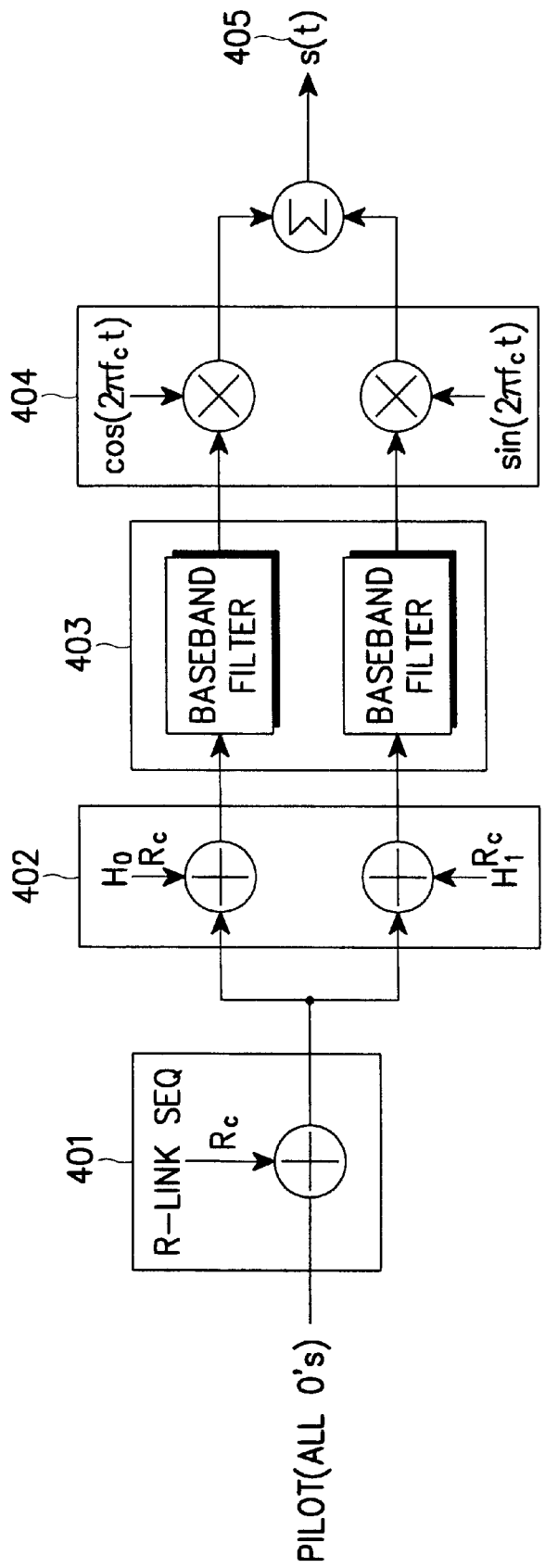
FIGS. 4A and 4B are block diagrams illustrating a packet access channel structure in a conventional W-CDMA system.

A description will now be made as to how the PCS/PPCS variable channel device serves as a reverse channel. When the PCS select signal is 0, the first and second AND gates 749 and 755 discard the information bits of the signaling channel and the information bits of the forward power control channel. Therefore, the PCS/PPCS variable channel device serves as the access pilot channels of the access channel, similar to the functions as shown in FIGS. 1A and 4A.

Figure 2A:
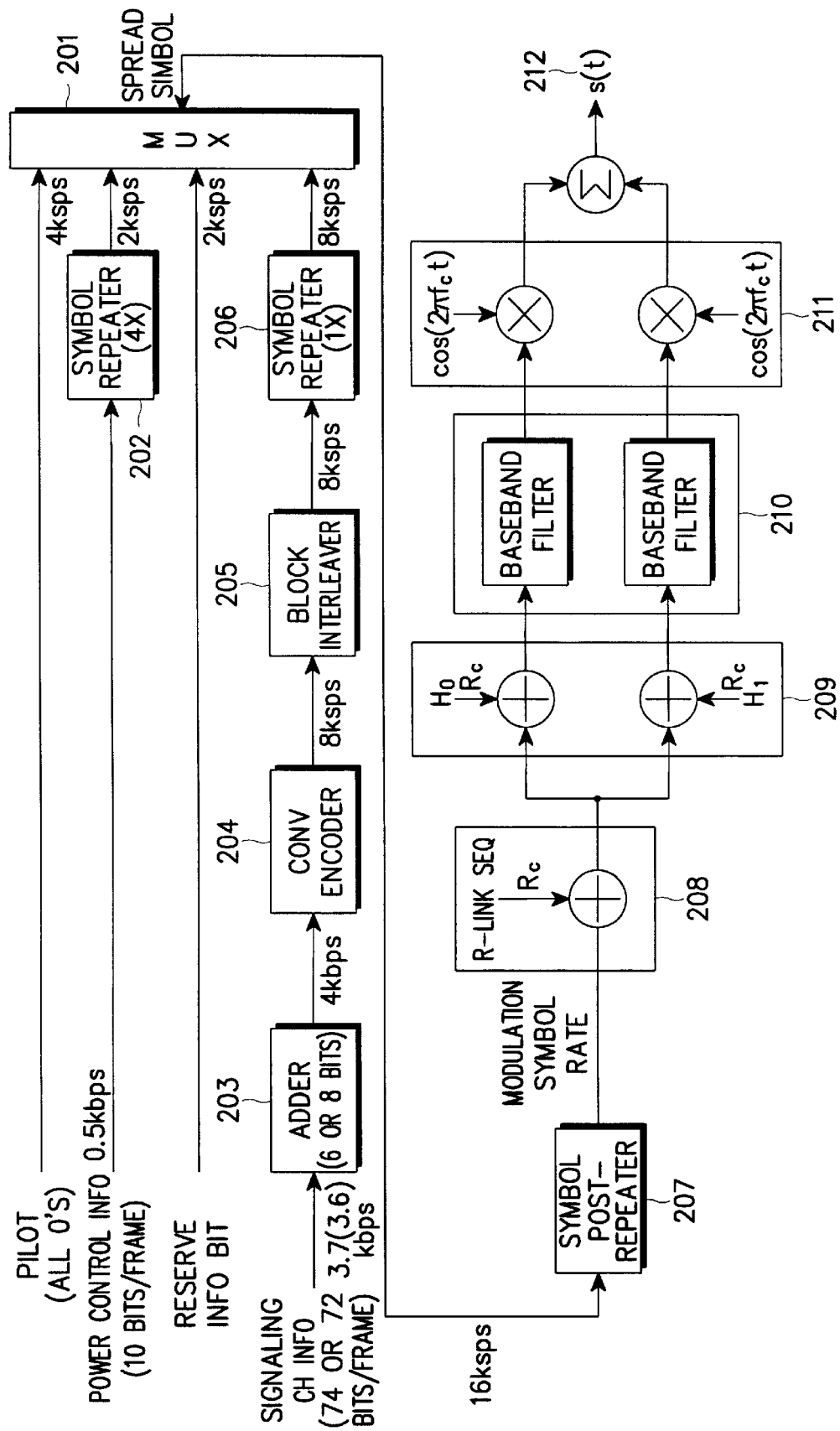
FIGS. 2A and 2B are block diagrams illustrating a reverse traffic channel structure supporting a single-signal mode in a conventional W-CDMA system.
Figure 3A:
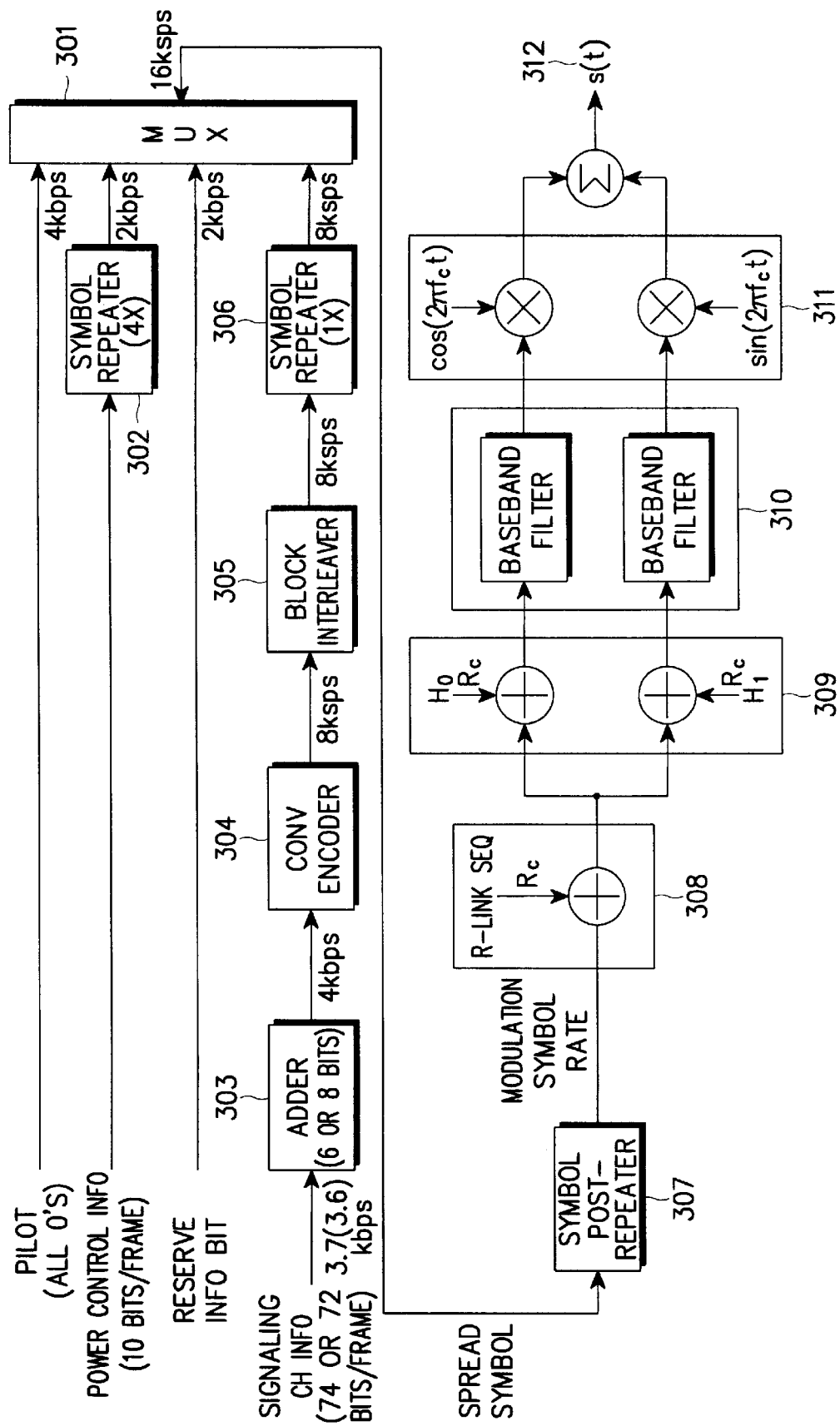
FIGS. 3A to 3C are block diagrams illustrating a reverse traffic channel structure supporting a multi-signal mode in a conventional W-CDMA system.

When the PCS select signal is 1, the first and second AND gates 749 and 755 output the information bit of the signaling channel and the information bit for the forward power control channel. Therefore, the PCS/PPCS variable channel device serves as the pilot and power control signaling (PPCS) channels of the reverse traffic channel, similar to the functions as shown in FIGS. 2A and 3A.

Figure 5A:
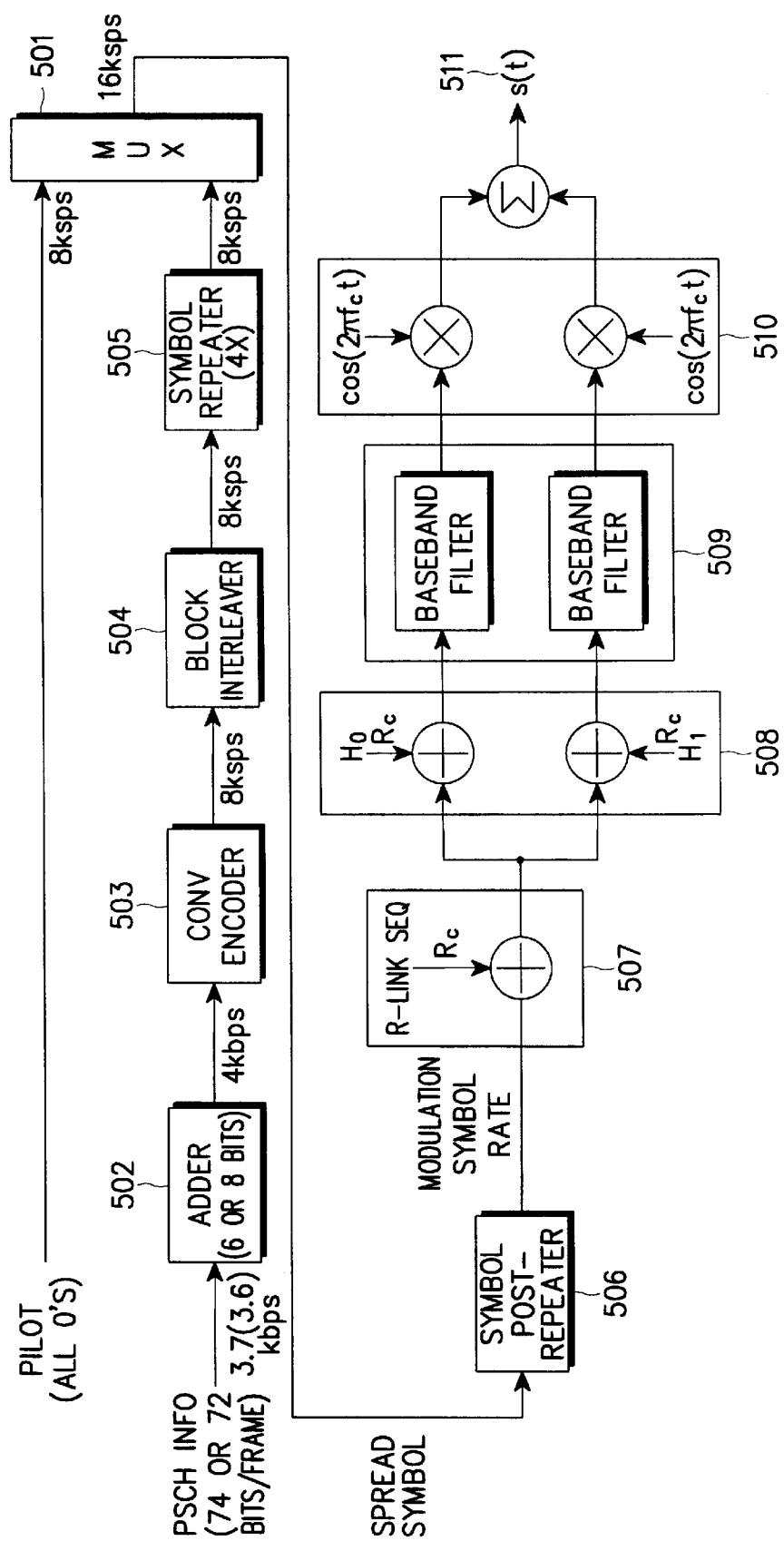
FIGS. 5A and 5B are block diagrams illustrating a reverse packet traffic channel structure supporting a single-signal mode in a conventional W-CDMA system.

When the PCS select signal is 1 and the first time division multiplexer 710 is set to the packet mode of operation, the PCS/PPCS variable channel device serves as the pilot channel and packet signaling channel of the reverse traffic channel in the packet mode, similar to the functions as shown in FIG. 5A.

Figure 6A:
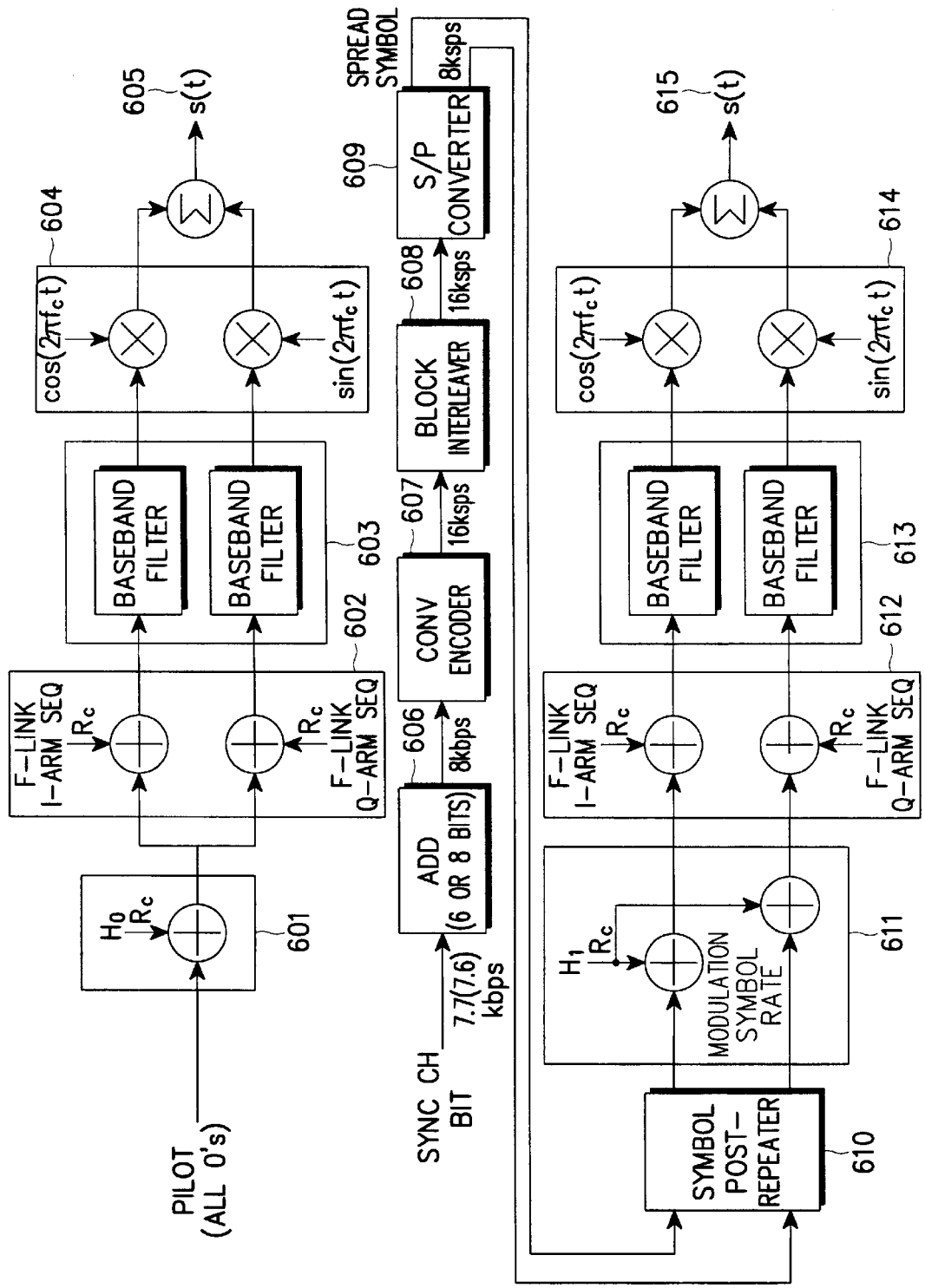
FIGS. 6A to 6E are block diagrams illustrating a forward channel structure in a conventional W-CDMA system.

Further, a description will be made as to how the PCS/PPCS variable channel device serves as a forward channel. When the PCS select signal is 0, the first and second AND gates 749 and 755 discard the information bits of the signaling channel and the information bits of the forward power control channel. Therefore, the PCS/PPCS variable channel device serves as the pilot channel, similar to the functions as shown in FIG. 6A

Figure 6B:
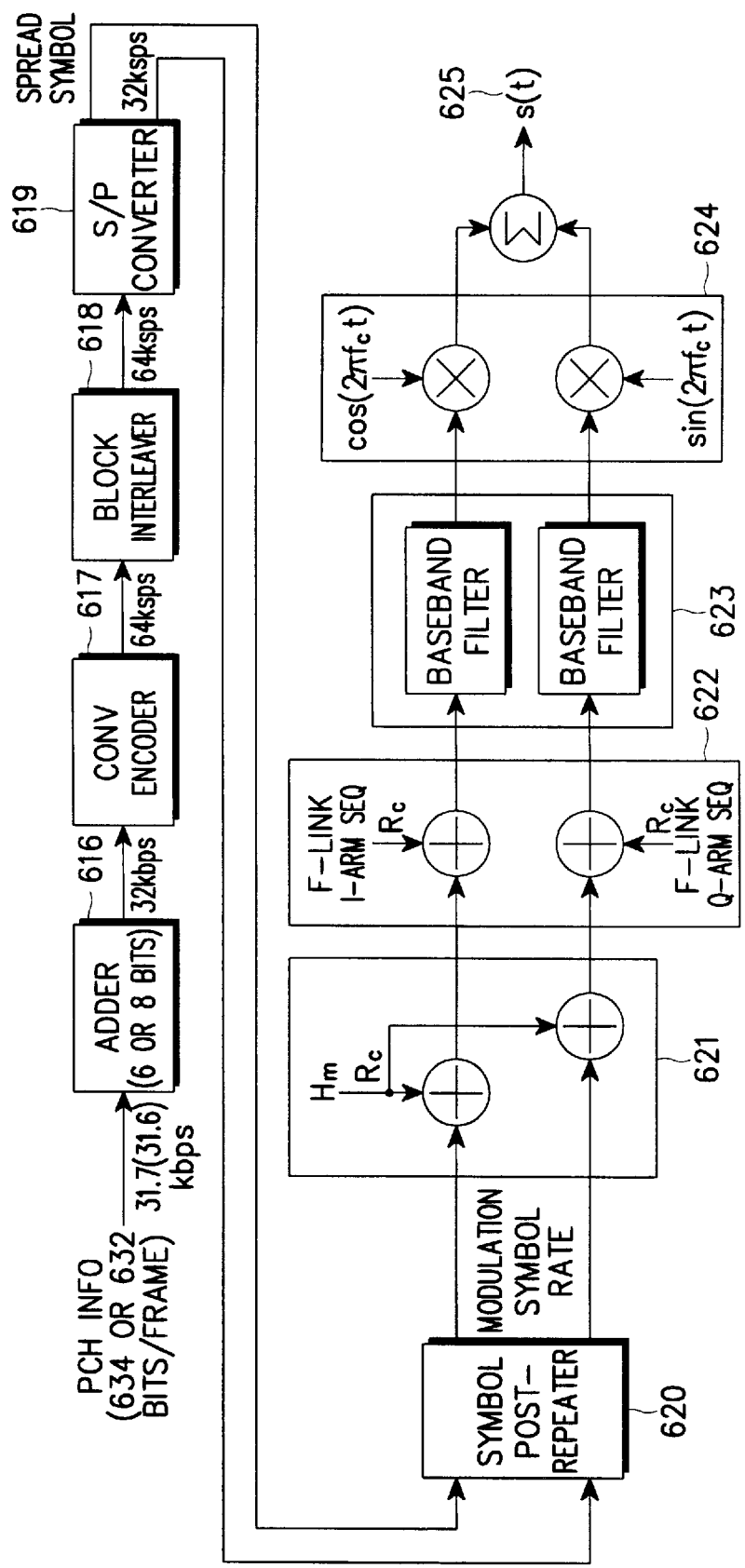
Figure 6C:
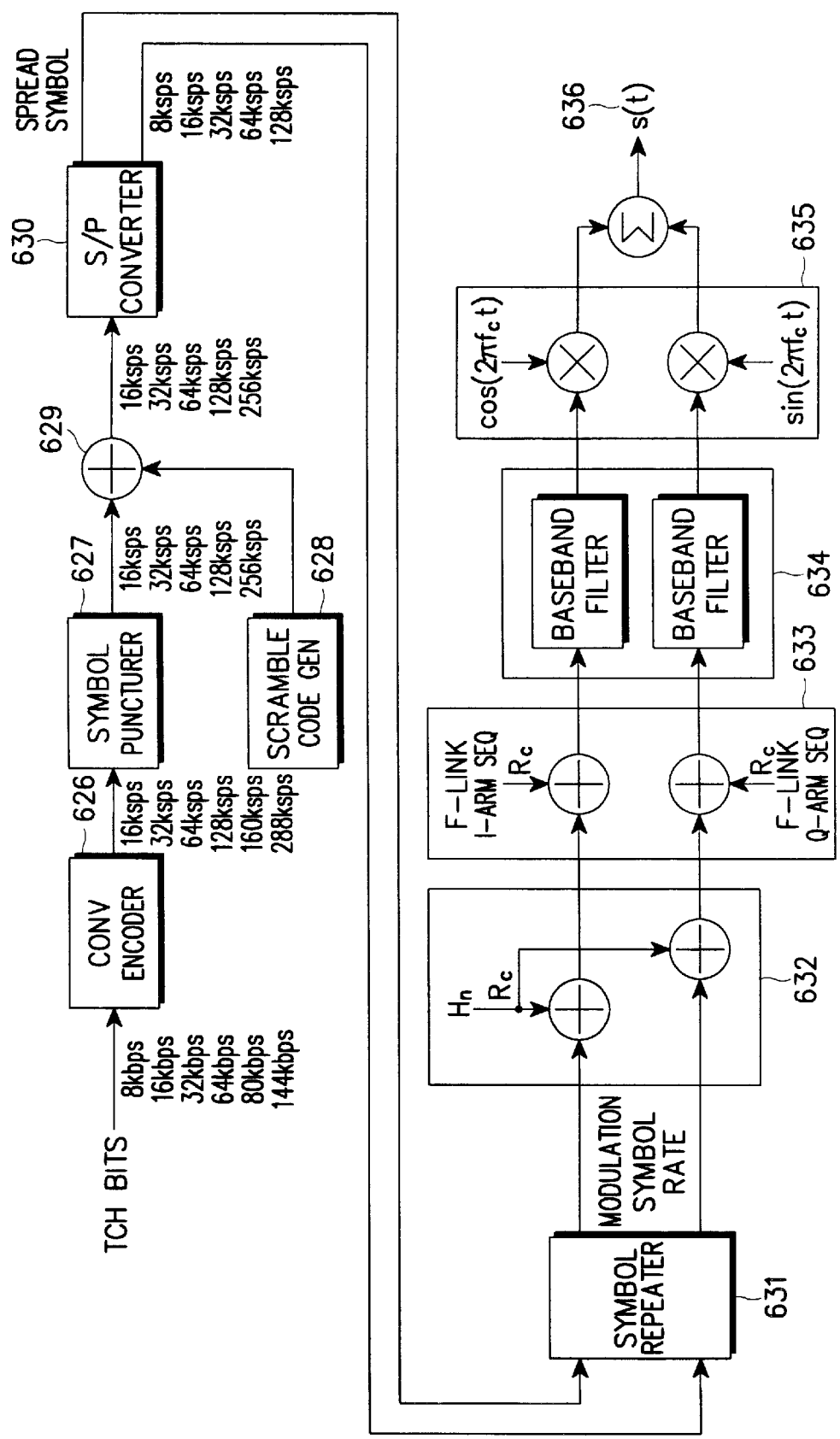
Figure 6D:
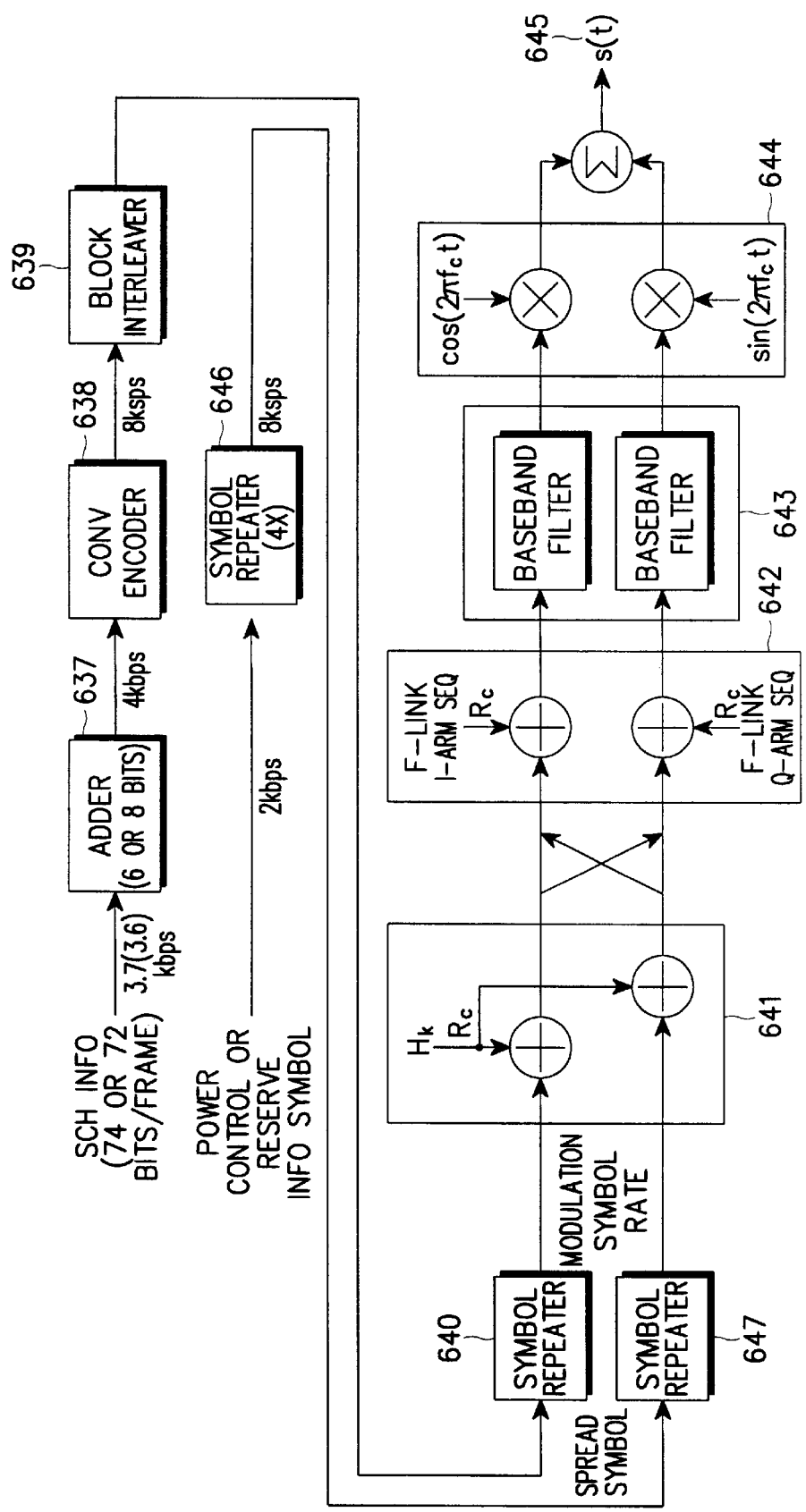

When the PCS select signal is 1, the first and second AND gates 749 and 755 output the information bit of the signaling channel and the information bit of the forward power control channel. Therefore, the PCS/PPCS variable channel device serves as the power control and signaling (PCS) channel, similar to the functions as shown in FIG. 6D.

As described above, the PCS/PPCS variable channel device of FIG. 7 can serve as forward and reverse pilot channels, signaling channels and power control channels.

Figure 8:
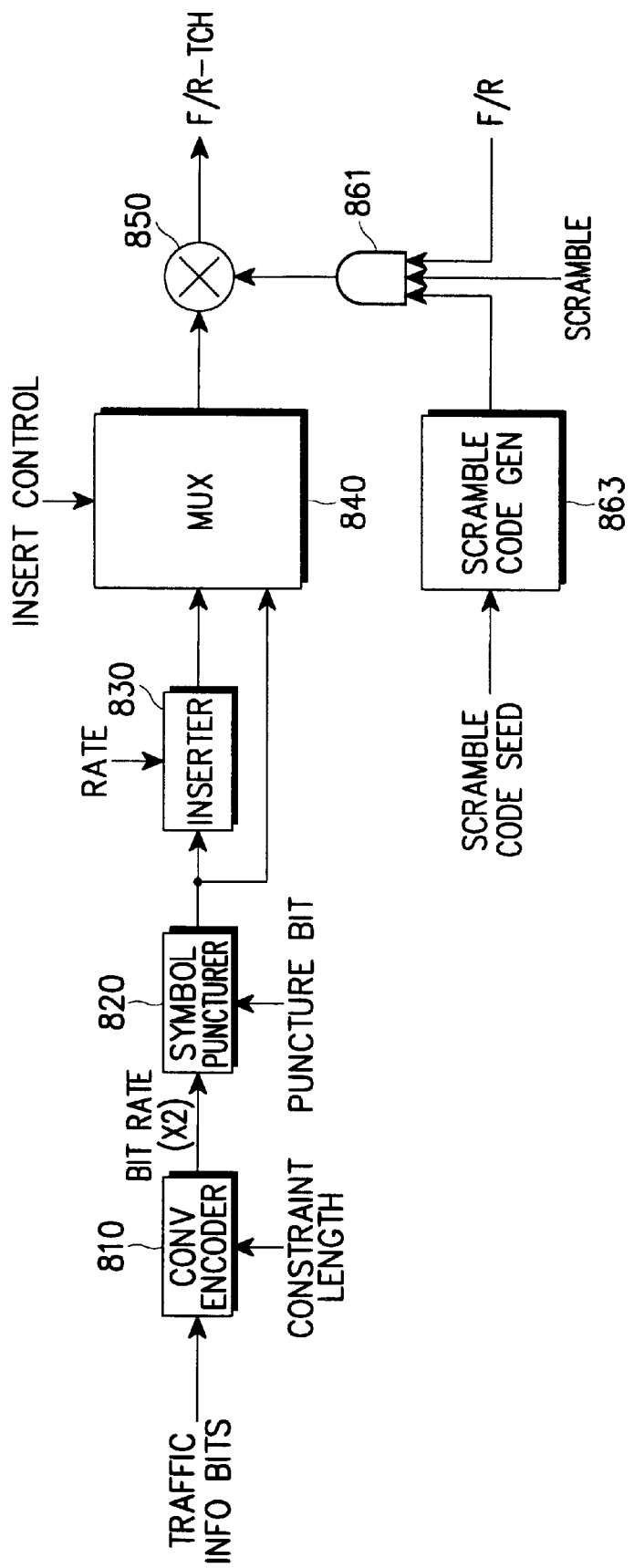
FIG. 8 is a block diagram illustrating a traffic variable channel device according to another embodiment of the present invention.

FIG. 8 illustrates a traffic variable channel device according to an embodiment of the present invention. As illustrated, the traffic variable channel device includes a convolutional encoder 810 for receiving traffic information bits; a symbol puncturer 820 connected to receive the output of the convolutional encoder 810; an inserter 830 connected to receive the output of the symbol puncturer 820; a multiplexer 840 connected to receive the output of the inserter 830 and the symbol puncturer 820; a scramble code generator 863 for receiving a scramble code seed; an AND gate 861 connected to the output of the scramble code generator 863 for receving a scramble select signal and a forward/reverse select signal; and, a scramble code spreader 850 connected to receive the output of the multiplexer 840 and the AND gate 861, for generating a forward/reverse traffic channel signal.

The convolutional encoder 810 convolutionally encodes the information bits of the signaling channel according to a constraint length, which is determined by a single-bit constraint length select signal. The constrain length is 9 when the constraint length select signal is 0, and the constraint length is 7 when the constraint length select signal is 1.

The symbol puncturer 820 punctures specific bits from the convolutionally encoded symbols according to a puncturing technique, wherein the bits to be punctured are selected by a puncture bit select signal. The symbol puncturer 820 does not perform puncturing in response to the puncture bit select signal of 0; however, it punctures the associated number of bits from the encoded symbols when the puncture bit select signal is 5 or 9. The inserter 830 inserts a specific bit block in the symbol-punctured signal according to a rate select signal. The multiplexer 840 selects the bit block-inserted signal or the non-bit block-inserted signal according to an insert control signal.

The AND gate 861 discards the scramble code output from the scramble code generator 863 when the scramble select signal is 0 or when the forward/reverse select signal is 0. That is, the scramble function is disabled and the variable channel device operates as a reverse channel, and the scramble code spreader 850 does not perform the scrambling.

Figure 1B:
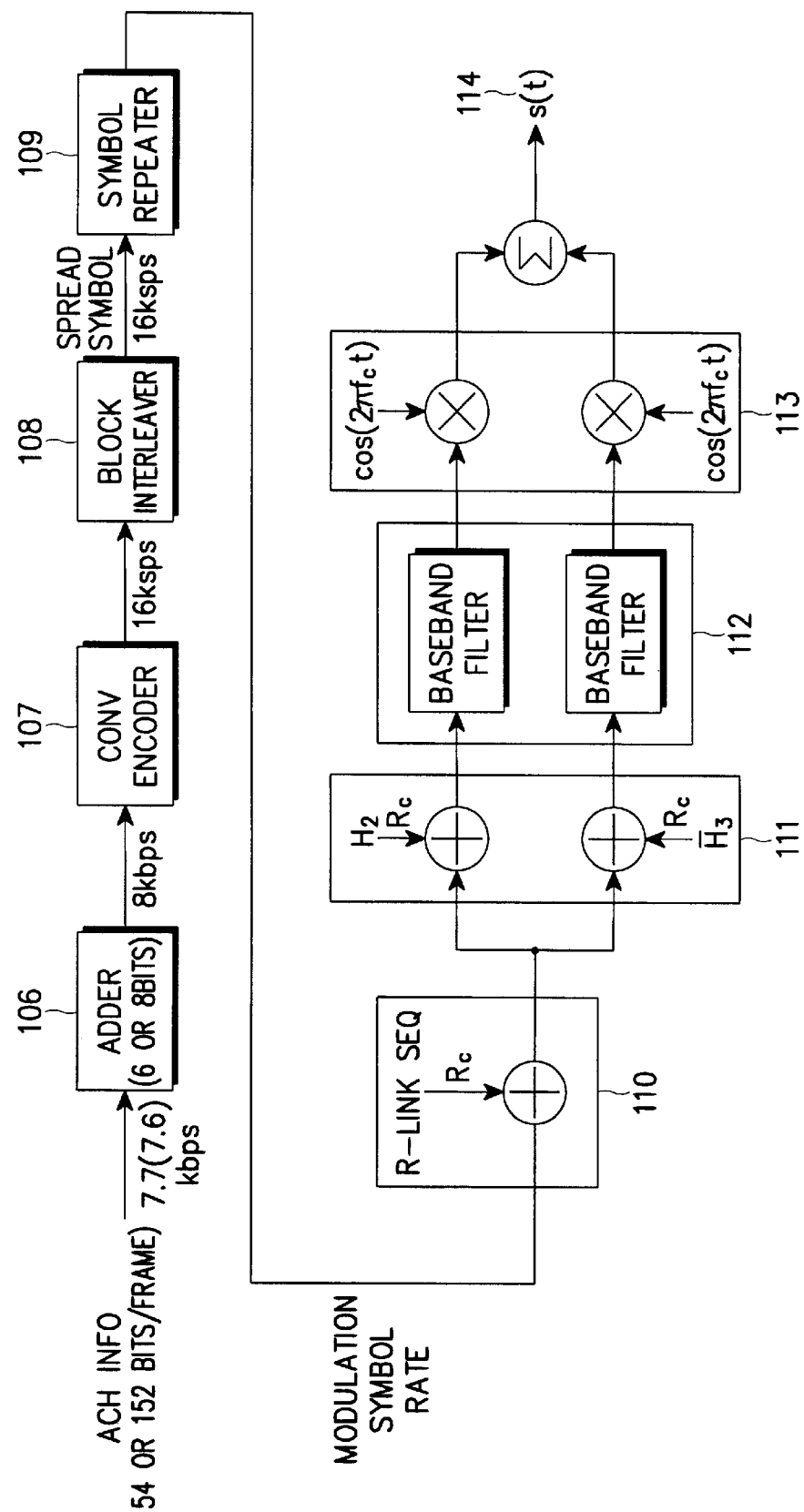
Figure 2B:
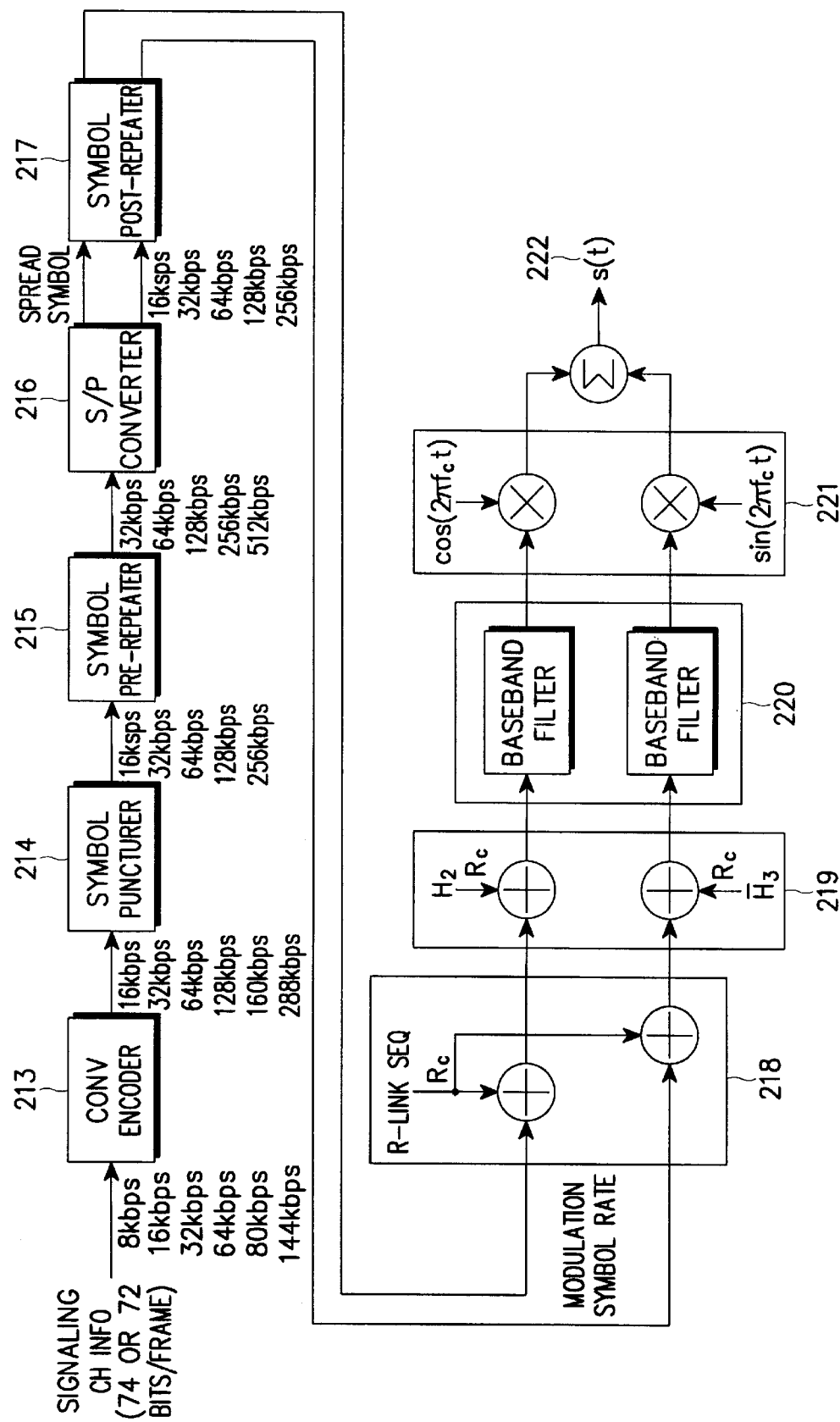
Figure 3B:
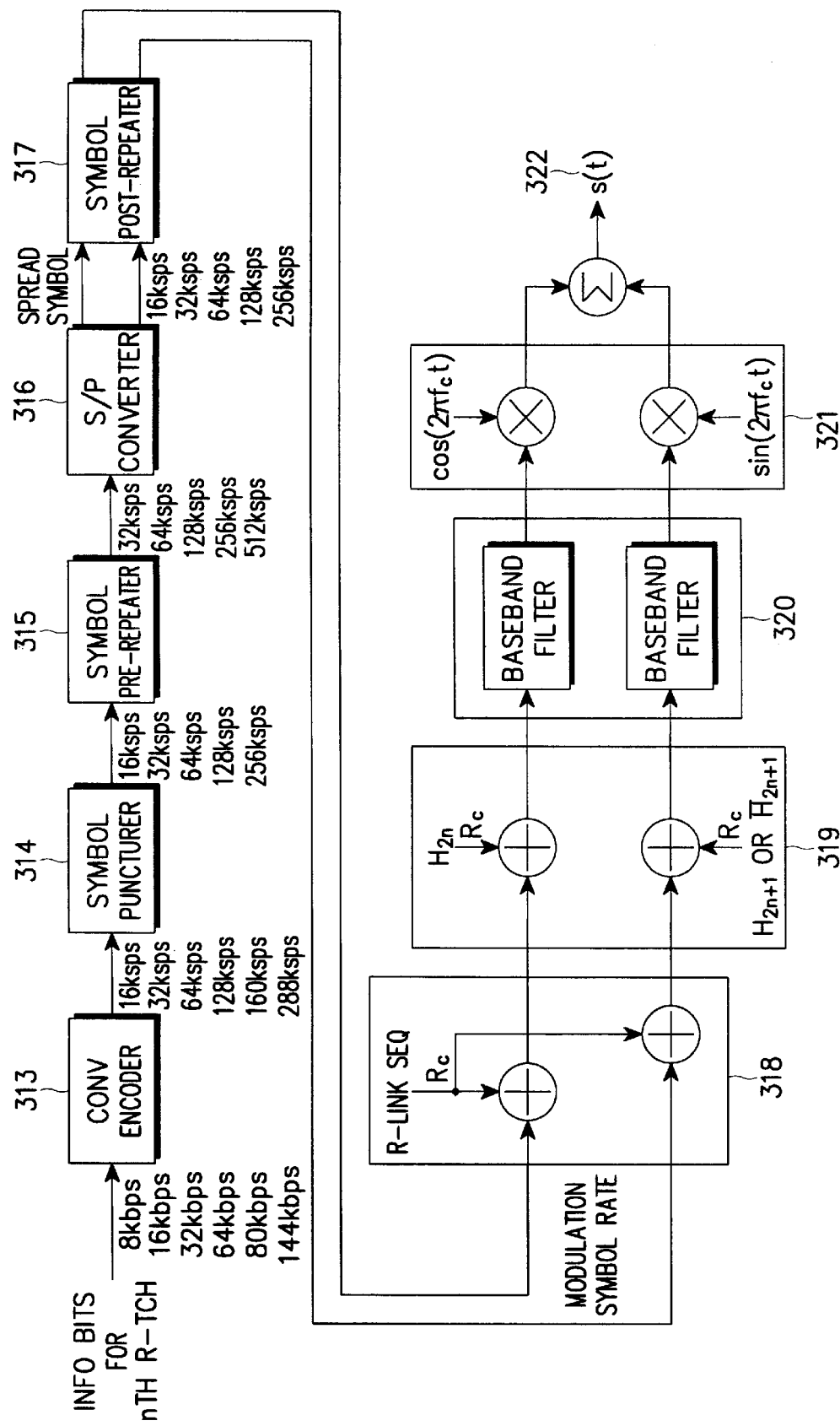
Figure 3C:
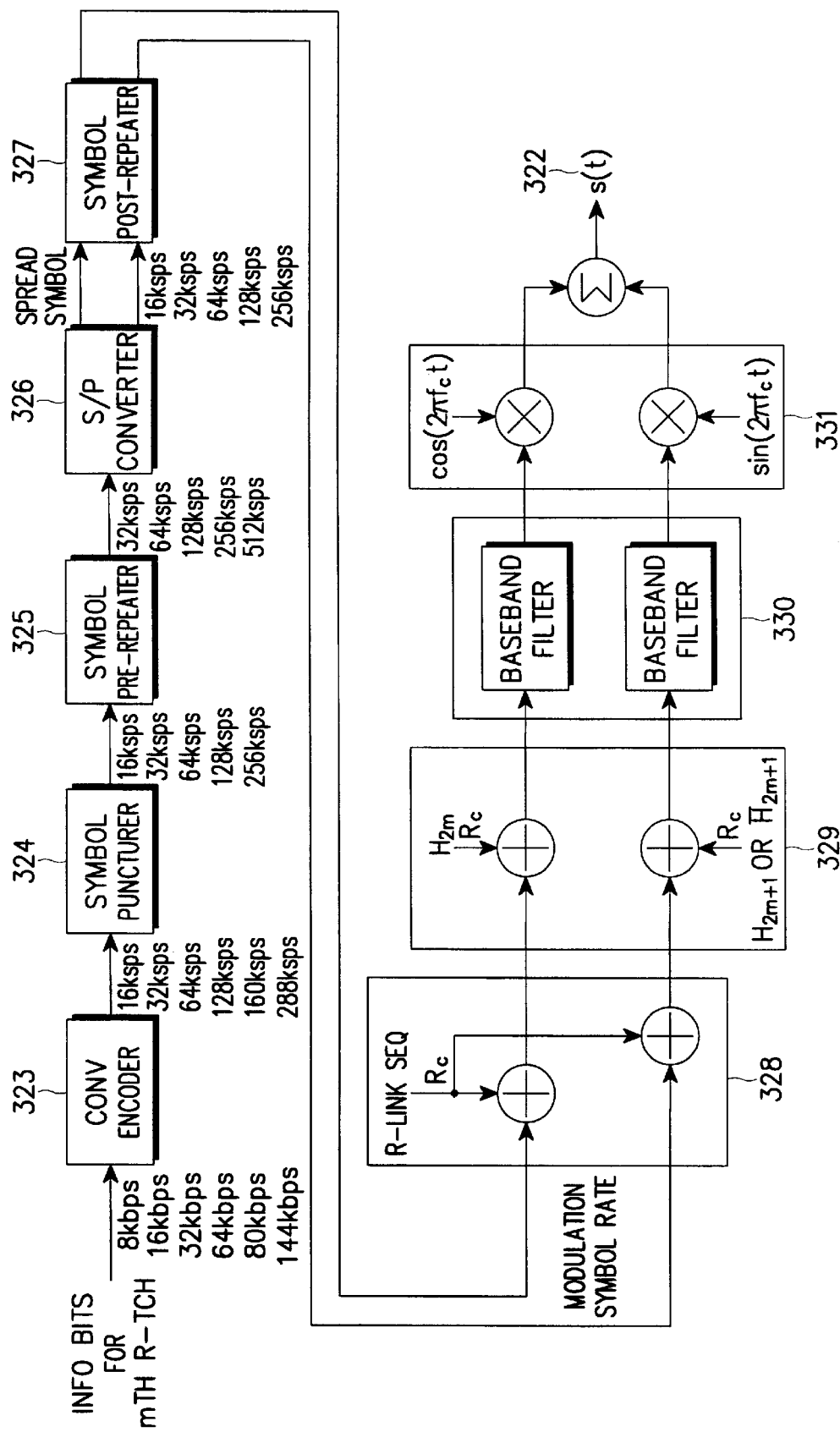
Figure 4B:
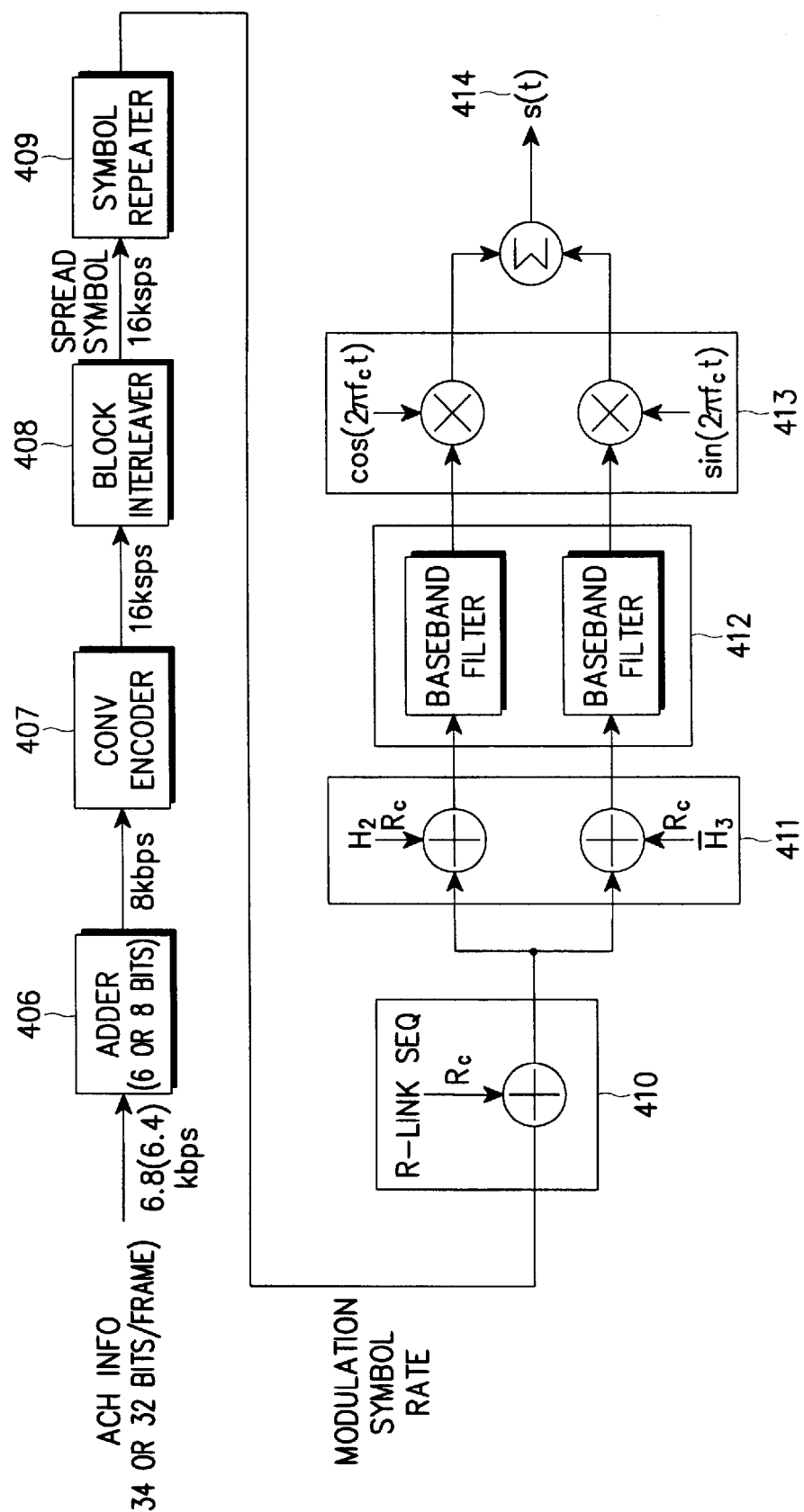
Figure 5B:
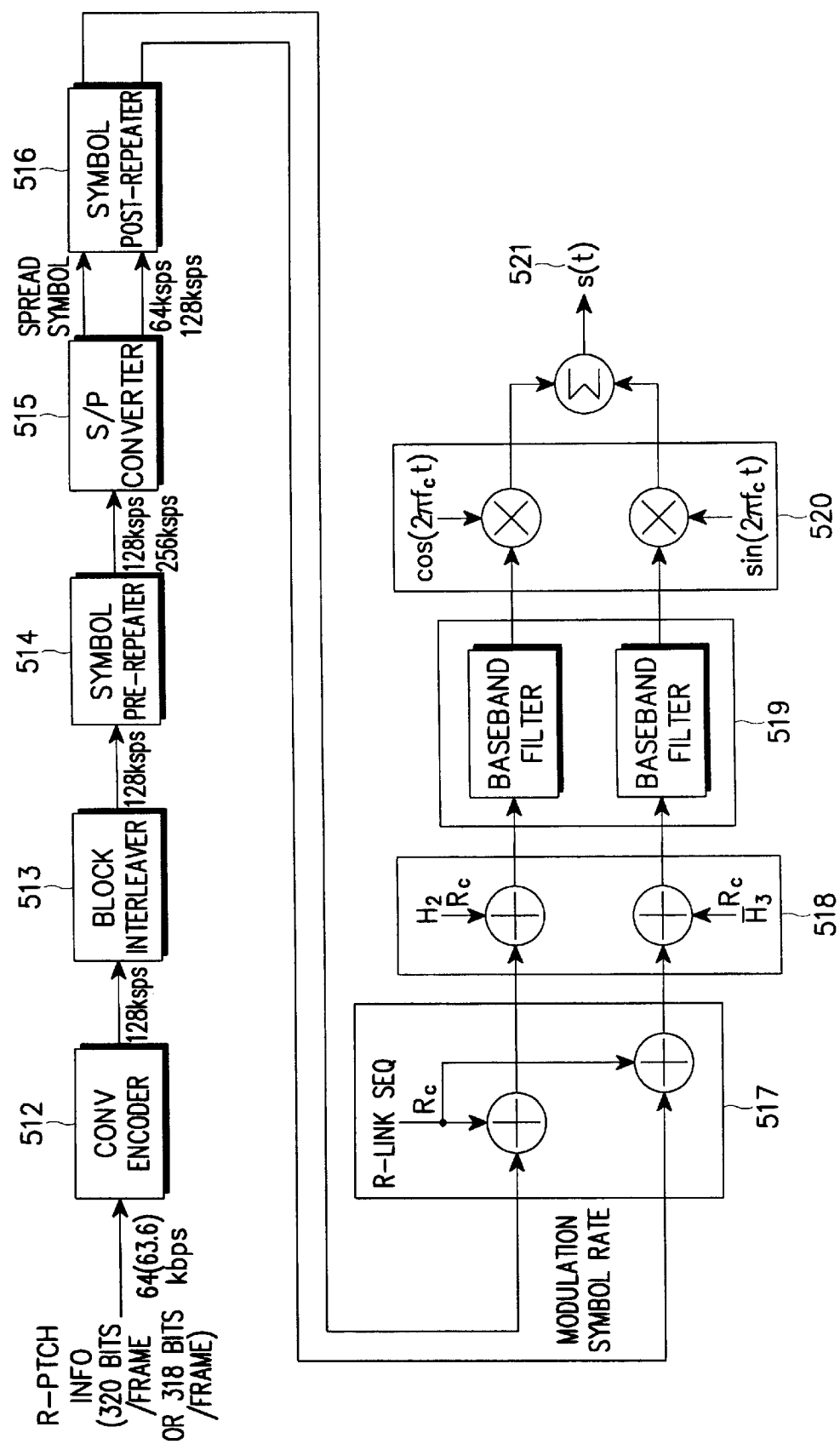

A description will now be made as to how the traffic variable channel device serves as a reverse channel. When the forward/reverse select signal is 0, the traffic variable channel device prepares to serve as a reverse channel. In the meantime, when the scramble select signal is set to 0, the scramble code spreader 850 is disabled. Therefore, the traffic variable channel device of FIG. 8 serves as the access channel similar to FIG. 1B or the reverse traffic channel similar to FIGS. 2B, 3B or 3C. In addition, when the forward/reverse select signal is 0 and the scramble select signal is set to 1 and the packet mode is activated, the traffic variable channel device serves as the packet access channel similar to FIG. 4B, or as a reverse packet traffic channel similar to FIG. 5B.

Figure 6E:
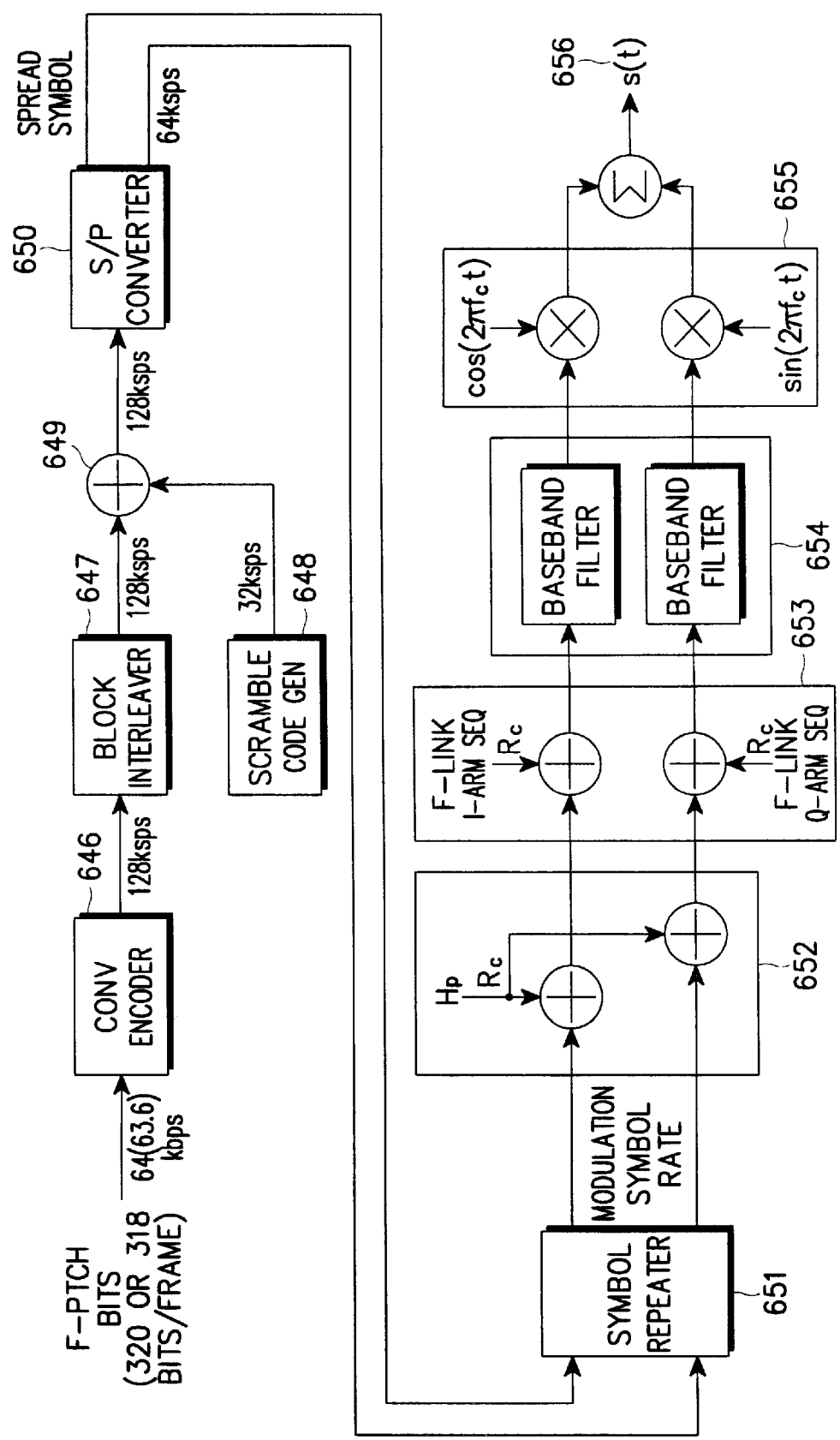

Next, a description will be made as to how the traffic variable channel device serves as a forward channel. When the forward/reverse select signal is 1, the traffic variable channel device prepares to serve as a forward channel. In the meantime, when the scramble select signal is set to 0, the scramble code spreader 850 is disabled. Therefore, the traffic variable channel device serves as an access channel similar to FIG. 6A or as a paging channel similar to FIG. 6B. In addition, when the scramble select signal is set to 1 and the forward/reverse select signal is 1 the traffic variable channel device serves as the traffic channel similar to FIG. 6C or as a packet traffic channel similar to FIG. 6E.

Accordingly, the traffic variable channel device of FIG. 8 can serve as access channel, reverse traffic channel, forward sync channel, paging channel and forward traffic channel.

In this manner, it is possible to implement, in a single variable channel device to provide access channel and traffic channel for the reverse link, and pilot channel, sync channel, paging channel and power control and signaling (PCS) channel for the forward link, which can be used in a W-CDMA cellular radio communication system. This is achieved by controlling the variable channel device using various select signals, thereby reducing the number of the elements required for the channels. Therefore, when the device according to the present invention is implemented in ASIC, it can have increased reliability and reduced power consumption.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A variable channel device for a wideband code division multiple access (W-CDMA) system, comprising:

a frame quality indicator for receiving information bits of a reverse power control channel;

a serial-to-parallel converter coupled to the output of the frame quality indicator;

a first multiplexer coupled to the output of the frame quality indicator and the serial-to-parallel converter;

a first symbol repeater coupled to the output of the first multiplexer;

a second symbol repeater for repeating symbols of discontinuous transmission data for a reserve channel;

a second multiplexer coupled to the output of the frame quality indicator, the serial-to-parallel converter and the second symbol repeater, and for receiving information bits of a pilot channel;

a third symbol repeater coupled to the output of the second multiplexer;

a convolutional encoder for receiving information bits of a signaling channel;

a symbol puncturer coupled to the output of the convolutional encoder;

an inserter coupled to the output of the symbol puncturer;

a third multiplexer coupled to the output of the symbol puncturer and the inserter;

a first-time-division-multiplexer coupled to collectively receive the output of the first symbol repeater, the third symbol repeater, the third multiplexer, for outputting a reverse PCS channel signal;

a fourth symbol repeater for repeating symbols of discontinuous transmission data for the reserve channel;

a second-time-division-multiplexer coupled to receive the output of the fourth symbol repeater and for receiving information bits for a forward power control channel;

a fifth symbol repeater coupled to the output of the second time-division-multiplexer;

a first AND gate coupled to the output of the third multiplexer; and, a second AND gate coupled to the output of the fifth symbol repeater, wherein the first AND gate and the second AND gate selectively outputs a forward PCS channel signal in response to a PCS select signal.

2. The variable channel device as claimed in claim 1, wherein the first multiplexer receives an output signal of the frame quality indicator at $0^{th}$, $2^{nd}$ and $3^{rd}$ input nodes, and an upper output signal of the serial-to-parallel converter at a $1^{st}$ input node, and selects one of the four input nodes in response to a reserve channel select signal.

3. The variable channel device as claimed in claim 1, wherein the second multiplexer receives the output signal of the frame quality indicator at a $0^{th}$ input node, a lower output signal of the serial-to-parallel converter at a $1^{st}$ input node, the information bits for the pilot channel at a $2^{nd}$ input node, and an output signal of the second symbol repeater at a $3^{rd}$ input node, and selects one of the four input nodes in response to a reserve channel select signal.

4. The variable channel device as claimed in claim 1, wherein the convolutional encoder convolutionally encodes the information bits of the signaling channel in response to a constraint length which is determined by a constraint length select signal.

5. The variable channel device as claimed in claim 1, wherein the symbol puncturer punctures specific bits from the convolutionally encoded symbols, wherein the bits to be punctured are selected by a puncture bit select signal.

6. The variable channel device as claimed in claim 5, wherein the symbol puncturer does not operate when the puncture bit select signal is 0.

7. The variable channel device as claimed in claim 1, wherein the inserter inserts a specific bit block in the output signal of the symbol puncturer according to a rate select signal.

8. The variable channel device as claimed in claim 1, wherein the third multiplexer selects one of the output signal of the symbol puncture and the output signal of the inserter in response to an insert control signal.

9. The variable channel device as claimed in claim 1, wherein the first time division multiplexer collectively time-division-multiplexes information bits of the pilot channel, the output from the first symbol repeater, the output from the third symbol repeater and the output from the third multiplexer during a non-packet mode.

10. The variable channel device as claimed in claim 1, wherein the first time division multiplexer time-division-multiplexes the information bits of the pilot channel and the output from the third multiplexer during a packet mode.

11. The variable channel device as claimed in claim 1, wherein the second time division multiplexer consists of:

a 2×1 multiplexer and a 2×1 time-division-multiplexer, wherein the second time division multiplexer selectively receives the output data from the forth symbol repeater in response to a reserve channel select signal.

12. A variable channel device for a W-CDMA system, comprising:

a convolutional encoder for receiving traffic information bits;

a symbol puncturer coupled to the output of the convolutional encoder;

an inserter coupled to the output of the symbol puncturer;

a multiplexer coupled to the output of the inserter and the symbol puncturer;

a scramble code generator for receiving a scramble code seed;

an AND gate coupled to the output of the scramble code generator, and for receiving a scramble select signal and a forward/reverse select signal; and, a scramble code spreader coupled to the output of the multiplexer and the AND gate, for generating a forward/reverse traffic channel signal.

13. The variable channel device as claimed in claim 12, wherein the convolutional encoder convolutionally encodes the information bits of the signaling channel in response to a constraint length which is determined by a constraint length select signal.

14. The variable channel device as claimed in claim 12, wherein the symbol puncturer punctures specific bits from the convolutionally encoded symbols, wherein the bits to be punctured are selected by a puncture bit select signal.

15. The variable channel device as claimed in claim 14, wherein the symbol puncturer does not operate when the puncture bit select signal is 0.

16. The variable channel device as claimed in claim 12, wherein the inserter inserts a specific bit block in the output of the symbol puncturer according to a rate select signal.

17. The variable channel device as claimed in claim 12, wherein the multiplexer selects one of the output signal of the symbol puncturer and the output of the inserter in response to an insert control signal.

18. The variable channel device as claimed in claim 12, wherein the scramble code spreader is disabled when the scramble select signal is 0.

19. The variable channel device as claimed in claim 12, wherein variable device is not operable when the variable channel device is in a reverse channel mode.

* * * * *